(12) United States Patent
Liu

(10) Patent No.: US 11,237,938 B2
(45) Date of Patent: Feb. 1, 2022

(54) CLICK HEATMAP ABNORMALITY DETECTION METHOD AND APPARATUS

(71) Applicant: BEIJING GRIDSUM TECHNOLOGY CO., LTD., Beijing (CN)

(72) Inventor: Zhenhua Liu, Beijing (CN)

(73) Assignee: BEIJING GRIDSUM TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/641,941

(22) PCT Filed: Aug. 21, 2018

(86) PCT No.: PCT/CN2018/101478
§ 371 (c)(1),
(2) Date: Feb. 25, 2020

(87) PCT Pub. No.: WO2019/062382
PCT Pub. Date: Apr. 4, 2019

(65) Prior Publication Data
US 2020/0250065 A1    Aug. 6, 2020

(30) Foreign Application Priority Data
Sep. 30, 2017 (CN) .......................... 201710915326.0

(51) Int. Cl.
*G06F 11/34* (2006.01)
*G06F 16/958* (2019.01)

(52) U.S. Cl.
CPC ...... *G06F 11/3438* (2013.01); *G06F 11/3466* (2013.01); *G06F 16/958* (2019.01)

(58) Field of Classification Search
CPC ... G06Q 10/10; G06F 11/3438; G06F 16/958; G06F 11/3466
(Continued)

(56) References Cited

U.S. PATENT DOCUMENTS 6,138,045 A * 10/2000 Kupinski .............. G06T 7/0012
378/37
8,532,401 B2 * 9/2013 Kato .................... G06K 9/4638
382/225
(Continued)

FOREIGN PATENT DOCUMENTS

CN          101504671 A       8/2009
CN          103646108 A       3/2014
(Continued)

OTHER PUBLICATIONS

International Search Report (in English and Chinese) and Written Opinion (in Chinese) issued in PCT/CN2018/101478, dated Nov. 1, 2018; ISA/CN.
(Continued)

*Primary Examiner* — Manglesh M Patel
(74) *Attorney, Agent, or Firm* — Harness, Dickey & Pierce, P.L.C.

(57) ABSTRACT

A click heatmap abnormality detection method and apparatus, comprising: obtaining a first click heatmap, and dividing the first click heatmap into a plurality of regions (S100); for each region among the plurality of regions, respectively determining a click probability of a click action corresponding to each click source happening in the region (S200); for each click source, determining an abnormal click region corresponding to the click source according to the click probabilities (S300). The described solution determines abnormal click regions according to the click probabilities of the click actions corresponding to the click sources happening in the regions, without the need for manual identification, and with high accuracy and identification efficiency.

12 Claims, 1 Drawing Sheet

(58) Field of Classification Search
USPC .................. 715/700, 200; 701/114
See application file for complete search history.

(56) References Cited

U.S. PATENT DOCUMENTS

| | | | |
|---|---|---|---|
| 9,165,370 B2* | 10/2015 | Hirota | G06T 7/162 |
| 9,659,364 B2* | 5/2017 | Pekar | G06T 7/0012 |
| 2010/0095208 A1* | 4/2010 | White | G06F 16/9577 |
| | | | 715/704 |
| 2010/0131155 A1* | 5/2010 | Becker | G08G 1/167 |
| | | | 701/45 |
| 2010/0332962 A1 | 12/2010 | Hammer et al. | |
| 2012/0010920 A1 | 1/2012 | Yuan | |
| 2013/0091417 A1* | 4/2013 | Cordasco | G06F 16/986 |
| | | | 715/234 |
| 2013/0132833 A1* | 5/2013 | White | G06F 11/3438 |
| | | | 715/704 |
| 2015/0101050 A1 | 4/2015 | Nielson et al. | |
| 2017/0052654 A1* | 2/2017 | Cervelli | G06T 19/006 |
| 2019/0146616 A1* | 5/2019 | White | H04L 67/025 |
| | | | 715/704 |

FOREIGN PATENT DOCUMENTS

| | | |
|---|---|---|
| CN | 103714057 A | 4/2014 |
| CN | 104408185 A | 3/2015 |
| CN | 104715395 A | 6/2015 |
| CN | 106557481 A | 4/2017 |
| CN | 106776612 A | 5/2017 |
| CN | 106817235 A | 6/2017 |

OTHER PUBLICATIONS

Yujing Guo, "Design and Implementation of User Behavior Analysis System Based on Interactive Process," Beijing Jiaotong University, Jul. 2015.

Fabrizio Lamberti et al., "VDHM: Viewport-DOM based Heat Maps as a Tool for Visually Aggregating Web Users' Interaction Data from Mobile and Heterogeneous Devices," IEEE International Conference on Mobile Services, 2015; pp. 33-40.

First Chinese Office Action regarding Application No. 201710915326.0 dated Oct. 12, 2020. English translation provided by Unitalen Attorneys at Law.

* cited by examiner

CLICK HEATMAP ABNORMALITY DETECTION METHOD AND APPARATUS

This application is the national phase of International Application No. PCT/CN2018/101478, titled "CLICK HEATMAP ABNORMALITY DETECTION METHOD AND APPARATUS", filed on Aug. 21, 2018, which claims the priority to Chinese Patent Application No. 201710915326.0, titled "METHOD AND APPARATUS FOR DETECTING ABNORMALITY IN CLICK HEATMAP", filed on Sep. 30, 2017 with the China National Intellectual Property Administration, which is incorporated herein by reference in its entirety.

FIELD

The present disclosure relates to the field of detecting cheats in traffic, and in particular to, a method and an apparatus for detecting abnormality in a click heatmap.

BACKGROUND

With development of the Internet, users are more likely to browse various web pages of websites or interfaces of applications via electronic devices. More traffic can be brought to an advertisement buyer by purchasing an advertisement. Thereby, there are more users browsing and clicking a webpage on a website of the buyer, or an interface of an application of the buyer. Cheats in traffic has long damaged legitimate rights and interests of the advertisement buyer. For example, software that fakes traffic accesses the website of the buyer automatically and extensively, and performs a large number of clicks. The buyer pays for such clicks but does not profit from such clicks.

Since a click heatmap can well reflect a condition of clicks on the webpage of the website or the interface of the application, abnormal traffic can be recognized by determining an abnormal click action in the click heatmap. In conventional technology, the abnormal click action in the click heatmap is recognized manually, rendering low accuracy and poor efficiency in recognition.

SUMMARY

In view of the above, a method and an apparatus for detecting abnormality in a click heatmap are provided according to embodiments of the present disclosure. The above problems are solved or at least partially solved. Specific solutions are described as follows.

A method for detecting abnormality in a click heatmap is provided, including:
obtaining a first click heatmap;
dividing the first click heatmap into multiple regions;
determining, for each of the multiple regions, a click probability of a click action corresponding to each click source occurring in said region; and
determining, for each click source, an abnormal click region corresponding to said click source according to the click probability, where the abnormal click region is at least one of the multiple regions.

Optionally, dividing the first click heatmap into the multiple regions includes:
dividing the first click heatmap evenly into rectangular regions, where a quantity of the rectangular regions is row×col, row is a quantity of rows of the rectangular regions in the first click heatmap, and col is a quantity of columns of the rectangular regions in the first click heatmap.

Optionally, determining, for each click source, an abnormal click region corresponding to said click source according to the click probability includes:
for each click source P,
determining first relative entropy D1, of said click source P relative to other click sources $\overline{P}$, to be:

$$D1 = \Sigma_{i=1,j=1}^{row,col} d_{i,j} p_{i,j} \log(p_{i,j}/\overline{p}_{i,j});$$

determining, under a condition that D1 is less than a first preset threshold, all of $d_{i,j}$s when $\Sigma d_{i,j}$ is maximum; and
determining one of the rectangular regions as the abnormal click region, where the one of the rectangular regions corresponds to $d_{i,j}$ equal to 0 in the $d_{i,j}$s when $\Sigma d_{i,j}$ is maximum;
where i is a row number of the rectangular regions, j is a column number of the rectangular regions, $d_{i,j}$ is a region-anomaly identifier, $p_{i,j}$ is the click probability of said click source P in a rectangular region at an i-th one of the rows and a j-th one of the columns, $\overline{p}_{i,j}$ is the click probability of the other click sources $\overline{P}$ the rectangular region at the i-th one of the rows and the j-th one of the columns, and $d_{i,j}$ is equal to 0 or 1.

Optionally, determining, for each click source, an abnormal click region corresponding to said click source according to the click probability includes:
determining $d_{i,j}$s corresponding to each click source when H is minimum, where H is a sum of second relative entropy of each click source relative to other click sources, and $$H = \Sigma_{P \in U} \{\Sigma_{i=1,j=1}^{row,col} [d_{i,j} p_{i,j} \log(p_{i,j}/\overline{p}_{i,j}) + (1-d_{i,j})\overline{p}_{i,j} \log(\overline{p}_{i,j}/\delta b)]\};$$

determining, for each click source, one of the rectangular regions as the abnormal click region, where the one of the rectangular regions corresponds to $d_{i,j}$ equal to 0 in the $d_{i,j}$s corresponding to said click source;
where i is a row number of the rectangular regions, j is a column number of the rectangular regions, $d_{i,j}$ is a region-anomaly identifier, $p_{i,j}$ is the click probability of said click source P in a rectangular region at an i-th one of the rows and a j-th one of the columns, $\overline{p}_{i,j}$ is the click probability of the other click sources $\overline{P}$ the rectangular region at the i-th one of the rows and the j-th one of the columns, $d_{i,j}$ is equal to 0 or 1, $\delta$ is a penalty coefficient, b is a benchmark click probability, and b=1/(row×col).

Optionally, determining, for each click source, an abnormal click region corresponding to said click source according to the click probability includes:
determining, for each of the rectangular regions, a maximum among ratios of the click probability of every two click sources corresponding to said rectangular region; and
determining one of the rectangular regions as the abnormal click region, where the one of the rectangular regions corresponds to the maximum greater than a second preset threshold, and the second preset threshold is greater than one.

An apparatus for detecting abnormality in a click heatmap is provided, including a click heatmap obtaining unit, a probability determination unit and a region determination unit, where:
the click heatmap obtaining unit is configured to obtain a first click heatmap and divide the first click heatmap into multiple regions;
the probability determination unit is configured to determine, for each of the multiple regions, a click probability of a click action corresponding to each click source occurring in said region; and the region determination unit is configured to determine, for each click source, an abnormal click region corresponding to said click source according to the click probability, where the abnormal click region is at least one of the multiple regions.

Optionally, the click heatmap obtaining unit is further configured to:

divide the first click heatmap evenly into rectangular regions, where a quantity of the rectangular regions is row×col, row is a quantity of rows of the rectangular regions in the first click heatmap, and col is a quantity of columns of the rectangular regions in the first click heatmap.

Optionally, the region determination unit is further configured to:

for each click source P,
determine first relative entropy D1, of said click source P relative to other click sources $\bar{P}$, to be:

$$D1 = \Sigma_{i=1, j=1}^{row, col} d_{i,j} p_{i,j} \log(p_{i,j}/\bar{p}_{i,j});$$

determine, under a condition that D1 is less than a first preset threshold, all of $d_{i,j}$s when $\Sigma d_{i,j}$ is maximum; and determine one of the rectangular regions as the abnormal click region, where the one of the rectangular regions corresponds to $d_{i,j}$ equal to 0 in the $d_{i,j}$s when $\Sigma d_{i,j}$ is maximum;

where i is a row number of the rectangular regions, j is a column number of the rectangular regions, $d_{i,j}$ is a region-anomaly identifier, $p_{i,j}$ is the click probability of said click source P in a rectangular region at an i-th one of the rows and a j-th one of the columns, $\bar{p}_{i,j}$ is the click probability of the other click sources $\bar{P}$ the rectangular region at the i-th one of the rows and the j-th one of the columns, and $d_{i,j}$ is equal to 0 or 1.

A storage medium storing a program is provided, where the program when executed controls a device including the storage medium to perform any one of the aforementioned methods.

A processor configured to execute a program is provided, where when the processor executes the program, any one of the aforementioned methods is performed.

From the aforementioned technical solutions, the method and the apparatus for detecting abnormality in the click heatmap are provided according to embodiments of the present disclosure. The first click heatmap may be obtained and divided into the multiple regions. For each of the multiple regions, the click probability of the click action corresponding to each click source occurring in said region is determined. For each click source, the abnormal click region corresponding to said click source is determined according to the click probability. Based on the present disclosure, the abnormal click region is determined according to the click probability of the click action corresponding to each click source occurring in each region. Accuracy and recognition efficiency are high without manual recognition.

The above description is merely a summary of the technical solutions of the present disclosure. Hereinafter specific embodiments of the present disclosure are provided, such that the technical means of the present disclosure are better appreciated and can be implemented based on content of the description, and the aforementioned and other objects, features and advantages of the present disclosure are more apparent.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF EMBODIMENTS

Figure 1:
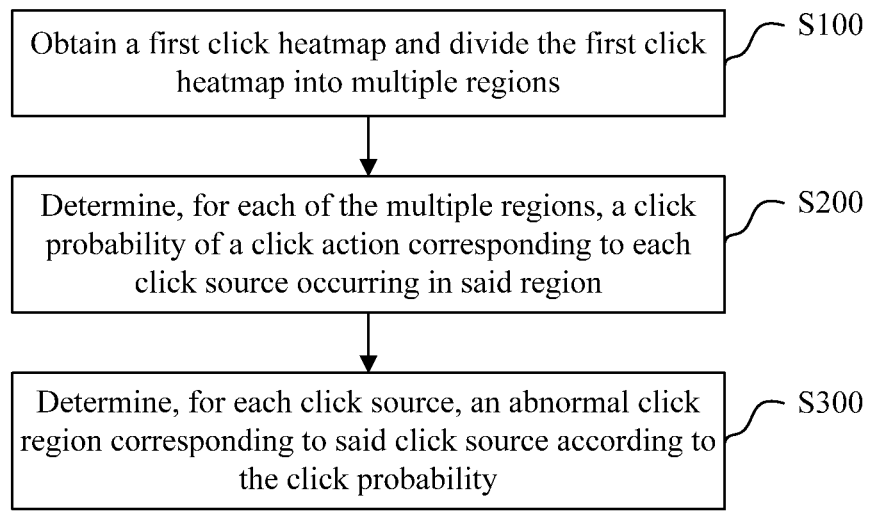
FIG. 1 is a flowchart of a method for detecting abnormality in a click heatmap according to an embodiment of the present disclosure.

Hereinafter exemplary embodiments of the present disclosure are described in more details in conjunction with the drawings. Although the exemplary embodiments of the present disclosure are illustrated in the drawings, it is understood that the present disclosure may be implemented in various forms and should not be limited by the embodiments set forth herein. Rather, the embodiments are provided to provide a more thorough understanding of the present disclosure, and capable to fully convey the scope of the present disclosure to those skilled in the art.

As shown in FIG. 1, a method for detecting abnormality in a click heatmap is provided according to an embodiment of the present disclosure. The method may include steps S100 to S300.

In step S100, a first click heatmap is obtained, and divided into multiple regions.

Specifically, the step S100 may include a following step.

The first click heatmap is evenly divided into rectangular regions, and a quantity of the rectangular regions is row×col. row is a quantity of rows of the rectangular regions in the first click heatmap. col is a quantity of columns of the rectangular regions in the first click heatmap.

In practice, a manner of obtaining the first click heatmap may include following steps.

Click data are collected from a terminal device.

The collected click data are normalized.

The first click heatmap is obtained according to a normalized click data.

Specifically, js code may be deployed in the terminal device according to an embodiment of the present disclosure. A click action from a visitor serves as a trigger condition. In a case that the click action occurs, the deployed js code sends the click data to a server in a post request. Thereby, a process of collecting the click data from the terminal device is completed.

A position of the webpage element may change significantly for different webpages due to different resolutions and different page sizes. Hence, the click data may be normalized in the present disclosure, so as to counteract a change in the position of the webpage element due to resolution and a page size.

Specifically, a quantity of pixels included in the rectangular region obtained after division may not exceed 100 according to an embodiment of the present disclosure. Optionally, the rectangular region is a square region of 4×4 pixels.

In practice, the click data in a certain rectangular region may be small, resulting in more discrete click data. Therefore, high-speed filtering may be used to smooth the click quantities in each rectangular region according to an embodiment of the present disclosure.

In step S200, for each region of the multiple regions, a click probability of a click action corresponding to each click source occurring in said region is determined.

In step S300, for each click source, an abnormal click region corresponding to said click source is determined according to the click probability. The abnormal click region is at least one of the multiple regions.

Specifically, the step S300 can be implemented in various manners, of which three exemplary ones are provided as follows.

In a first manner, the step S300 may include following steps.

Such steps are performed for each click source P.

First relative entropy D1, of the click source P relative to other click sources P, is determined to be:

$$D1 = \Sigma_{i=1, j=1}^{row, col} d_{i,j} p_{i,j} \log(p_{i,j}/\overline{p}_{i,j}).$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $\overline{p}_{i,j}$ is the click probability of the other click sources P the rectangular region at the i-th row and the j-th column. $d_{i,j}$ is equal to 0 or 1.

All of $d_{i,j}$s when $\Sigma d_{i,j}$ is maximum is determined, under a condition that D1 is less than a first preset threshold.

At least one rectangular region that corresponds to $d_{i,j}$ equal to 0 in the $d_{i,j}$s when $\Sigma d_{i,j}$ is maximum is determined as the abnormal click region.

According to this embodiment of the present disclosure, other click sources than the click source P are taken as an integrity $\overline{P}$, and relative entropy of P relative to $\overline{P}$ is calculated.

It can be understood that the abnormal click region obtained in the first manner corresponds to the click source. Namely, in a case that an abnormal click region is determined for a click source A according to such manner of the present disclosure, the determined abnormal click region is an abnormal click region for the click source A, instead of an abnormal click region for the other click sources.

It can be understood that the larger the $\Sigma d_{i,j}$ is, the more "1"s the $d_{i,j}$s takes. According to an embodiment of the present disclosure, the rectangular region corresponding to $d_{i,j}$ being 0 is determined as the abnormal click region, and the rectangular region corresponding to $d_{i,j}$ being 1 is determined as the normal click region. Hence, the more times $d_{i,j}$ takes "1", the more rectangular regions are determined as the normal click region. According to this embodiment of the present disclosure, the first preset threshold is limited, so that the first relative entropy D1 of the click source P relative to other click sources $\overline{P}$ is not too large. Thereby, a quantity of abnormal click regions that are mistaken as normal click regions can be controlled.

Specifically, in the first manner, the abnormal click action from the cheating click source in some low-probability click regions can be found based on the click probabilities form different click sources. Thereby, abnormal traffic is found. The relative entropy according to an embodiment of the present disclosure is a means for calibrating a difference in relative probability. A calculation result of the relative entropy increases as the difference between the click probabilities increases. According to such principle of the calculation result of the relative entropy, a numerical optimization method may be used according to an embodiment of the present disclosure, to eliminate the abnormal regions with large differences in the click probabilities. Thereby, the difference between the click probabilities of different click sources is minimized, so as to acquire relative entropy satisfying a preset condition. Correspondingly, such eliminated regions are abnormal click regions. It should be noted that the relative entropy is one method for calculating a difference in relative distribution, a method provided according to the present disclosure is not limited to using the relative entropy. Any method capable of calculating and calibrating a difference between different click sources may be used in the method for detecting abnormality in the click heatmap.

In a second manner, the step S300 may include following steps.

$d_{i,j}$ s corresponding to each click source when H is minimum are determined. H is a sum of second relative entropy of each click source relative to other click sources, and $$H = \Sigma_{P \in U}\{\Sigma_{i=1, j=1}^{row, col}[d_{i,j} p_{i,j} \log(p_{i,j}/\overline{p}_{i,j}) + (1-d_{i,j})\overline{p}_{i,j} \log(\overline{p}_{i,j}/\delta b)]\}.$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $\overline{p}_{i,j}$ is the click probability of the other click sources P the rectangular region at the i-th row and the j-th column. $d_{i,j}$ is equal to 0 or 1. $\delta$ is a penalty coefficient, b is a benchmark click probability, and b=1/(row×col).

For each click source, at least one rectangular region that corresponds to $d_{i,j}$ equal to 0 in the $d_{i,j}$s corresponding to said click source is determined as the abnormal click region.

Specifically, in the second manner, the penalty coefficient may be set for falsely determining the click regions. Namely, the penalty coefficient is set for determining a normal click region falsely to be an abnormal click region or determining an abnormal click region falsely to be a normal click region. According to the second manner, an optimization process of the $d_{i,j}$s can be controlled by the penalty coefficient, reducing probability of false determination.

In a third manner, the step S300 may further include following steps.

For each of the rectangular regions, a maximum is determined among ratios of the click probability of every two click sources corresponding to said rectangular region.

At least one rectangular region that corresponds to the maximum greater than a second preset threshold is determined as the abnormal click region. The second preset threshold is greater than one.

It can be understood that the maximum among ratios of the click probability of every two click sources represents a maximum difference between click probabilities of the click sources for the rectangular region. In a case that the maximum is large, it means that the rectangular region is abnormal click. In a case that the maximum is small, it may be determined that the rectangular region is normal.

Specifically, the third manner is a simplified manner based on mathematical reasoning in the first manner and the second manner. In the third manner, efficiency in detecting the abnormality of the click heatmap can be greatly improved without a large change in actual accuracy.

The method for detecting abnormality in the click heatmap is provided according to embodiments of the present disclosure. The first click heatmap may be obtained and divided into the multiple regions. For each of the multiple regions, the click probability of the click action corresponding to each click source occurring in said region is determined. For each click source, the abnormal click region corresponding to said click source is determined according to the click probability. Based on the present disclosure, the abnormal click region is determined according to the click probability of the click action corresponding to each click source occurring in each region. Accuracy and recognition efficiency are high without manual recognition.

Corresponding to the above method embodiments, an apparatus for detecting abnormality in a click heatmap is further provided according to an embodiment of the present disclosure.

Figure 2:
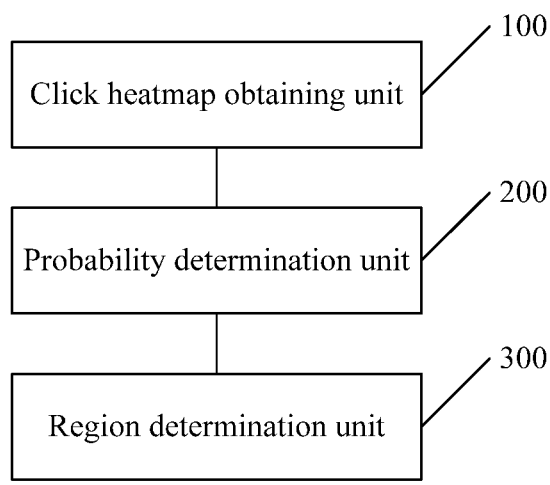
FIG. 2 is a schematic structural diagram of an apparatus for detecting abnormality in the click heatmap according to an embodiment of the present disclosure.

As shown in FIG. 2, an apparatus for detecting abnormality in the click heatmap is provided according to an embodiment of the present disclosure. The apparatus includes a click heatmap obtaining unit 100, a probability determination unit 200 and a region determination unit 300.

The click heatmap obtaining unit 100 is configured to obtain a first click heatmap and divide the first click heatmap into multiple regions.

The click heatmap obtaining unit 100 is further configured to divide the first click heatmap evenly into rectangular regions. A quantity of the rectangular regions is row×col. row is a quantity of rows of the rectangular regions in the first click heatmap. col is a quantity of columns of the rectangular regions in the first click heatmap.

The probability determination unit 200 is configured to determine, for each of the multiple regions, a click probability of a click action corresponding to each click source occurring in said region.

The region determination unit 300 is configured to determine, for each click source, an abnormal click region corresponding to said click source according to the click probability. The abnormal click region is at least one of the multiple regions.

The region determination unit 300 may be specifically configured to perform following operations.

Such operations are performed for each click source P:

First relative entropy D1, of the click source P relative to other click sources $\bar{P}$, is determined to be:

$$D1=\Sigma_{i=1,j=1}^{row,col} d_{i,j} p_{i,j} \log(p_{i,j}/\bar{p}_{i,j}).$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $\bar{p}_{i,j}$ is the click probability of the other click sources $\bar{P}$ the rectangular region at the i-th row and the j-th column. $d_{i,j}$ is equal to 0 or 1.

All of $d_{i,j}$s when $\Sigma d_{i,j}$ is maximum is determined, under a condition that D1 is less than a first preset threshold.

At least one rectangular region that corresponds to $d_{i,j}$ equal to 0 in the $d_{i,j}$s when $\Sigma d_{i,j}$ is maximum is determined as the abnormal click region.

The region determination unit 300 may be specifically configured to perform following operations.

$d_{i,j}$s corresponding to each click source when H is minimum are determined. H is a sum of second relative entropy of each click source relative to other click sources, and $$H=\Sigma_{P\in U}\{\Sigma_{i=1,j=1}^{row,col}[d_{i,j}p_{i,j}\log(p_{i,j}/\bar{p}_{i,j})+(1-d_{i,j})\bar{p}_{i,j}\log(\bar{p}_{i,j}/\delta b)]\}.$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $\bar{p}_{i,j}$ is the click probability of the other click sources $\bar{P}$ the rectangular region at the i-th row and the j-th column. $d_{i,j}$ is equal to 0 or 1. $\delta$ is a penalty coefficient, b is a benchmark click probability, and b=1/(row×col).

For each click source, at least one rectangular region that corresponds to $d_{i,j}$ equal to 0 in the $d_{i,j}$s corresponding to said click source is determined as the abnormal click region.

The region determination unit 300 may be specifically configured to perform following operations.

For each of the rectangular regions, a maximum is determined among ratios of the click probability of every two click sources corresponding to said rectangular region.

At least one rectangular region that corresponds to the maximum greater than a second preset threshold is determined as the abnormal click region. The second preset threshold is greater than one.

The apparatus for detecting abnormality in the click heatmap is provided according to embodiments of the present disclosure. The first click heatmap may be obtained and divided into the multiple regions. For each of the multiple regions, the click probability of the click action corresponding to each click source occurring in said region is determined. For each click source, the abnormal click region corresponding to said click source is determined according to the click probability. Based on the present disclosure, the abnormal click region is determined according to the click probability of the click action corresponding to each click source occurring in each region. Accuracy and recognition efficiency are high without manual recognition.

The apparatus for detecting abnormality in the click heatmap includes a processor and a memory. The click heatmap obtaining unit, the probability determination unit and the region determination unit are all stored as program units in the memory. The processor executes the above program units stored in the memory to implement corresponding functions.

The processor includes a core. The core calls the corresponding program unit in the memory. A quantity of the core may be and one or more. The abnormal click region is determined by adjusting parameters of the core.

The memory may include a computer readable medium in a form such as non-persistent memory, random access memory (RAM), and/or non-volatile memory. For example, the memory is a read only memory (ROM) or a flash memory (flash RAM). The memory includes at least one memory chip.

A storage medium is provided according to an embodiment of the present disclosure. The storage medium stores a program. When the program is executed by a processor, the aforementioned method for detecting abnormality in the click heatmap is performed.

A processor is provided according to an embodiment of the present disclosure. The processor is configured to execute a program. When the program is executed, the aforementioned method for detecting abnormality in the click heatmap is performed.

A device is provided according to an embodiment of the present disclosure. The device includes a processor, a memory, and a program stored in the memory and executable by the processor. Following steps are performed when the processer executes the program.

A first click heatmap is obtained, and divided into multiple regions.

For each region of the multiple regions, a click probability of a click action corresponding to each click source occurring in said region is determined.

For each click source, an abnormal click region corresponding to said click source is determined according to the click probability. The abnormal click region is at least one of the multiple regions.

Optionally, dividing the first click heatmap into the multiple regions includes a following step.

The first click heatmap is evenly divided into rectangular regions, and a quantity of the rectangular regions is row×col. row is a quantity of rows of the rectangular regions in the first click heatmap. col is a quantity of columns of the rectangular regions in the first click heatmap.

Optionally, for each click source, determining an abnormal click region corresponding to said click source according to the click probability includes following steps.

Such steps are performed for each click source P.

First relative entropy D1, of the click source P relative to other click sources $\overline{P}$, is determined to be:

$$D1=\Sigma_{i=1,j=1}^{row,col} d_{i,j} p_{i,j} \log(p_{i,j}/\overline{p}_{i,j}).$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $\overline{p}_{i,j}$ is the click probability of the other click sources $\overline{P}$ the rectangular region at the i-th row and the j-th column. $d_{i,j}$ is equal to 0 or 1.

All of $d_{i,j}$s when $\Sigma d_{i,j}$ is maximum is determined, under a condition that D1 is less than a first preset threshold.

At least one rectangular region that corresponds to $d_{i,j}$ equal to 0 in the $d_{i,j}$s when $\Sigma d_{i,j}$ is maximum is determined as the abnormal click region.

Optionally, for each click source, determining an abnormal click region corresponding to said click source according to the click probability includes following steps.

$d_{i,j}$s corresponding to each click source when H is minimum are determined. H is a sum of second relative entropy of each click source relative to other click sources, and $$H=\Sigma_{P\in U}\{\Sigma_{i=1,j=1}^{row,col}[d_{i,j}p_{i,j}\log(p_{i,j}/\overline{p}_{i,j})+(1-d_{i,j})\overline{p}_{i,j}\log(\overline{p}_{i,j}/\delta b)]\}.$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $p_{i,j}$ is the click probability of the other click sources $\overline{P}$ the rectangular region at the i-th row and the j-th column. $d_{i,j}$ is equal to 0 or 1. $\delta$ is a penalty coefficient, b is a benchmark click probability, and b=1/(row×col).

For each click source, at least one rectangular region that corresponds to $d_{i,j}$ equal to 0 in the $d_{i,j}$s corresponding to said click source is determined as the abnormal click region.

Optionally, for each click source, determining an abnormal click region corresponding to said click source according to the click probability includes following steps.

For each of the rectangular regions, a maximum is determined among ratios of the click probability of every two click sources corresponding to said rectangular region.

At least one rectangular region that corresponds to the maximum greater than a second preset threshold is determined as the abnormal click region. The second preset threshold is greater than one.

The device herein may be a server, a PC, a PAD, a mobile phone, and the like.

A computer program product is further provided according to the present disclosure. When executed on a data processing device, the computer program product is adapted to execute and initialize a program that performs following steps.

A first click heatmap is obtained, and divided into multiple regions.

For each region of the multiple regions, a click probability of a click action corresponding to each click source occurring in said region is determined.

For each click source, an abnormal click region corresponding to said click source is determined according to the click probability. The abnormal click region is at least one of the multiple regions.

Optionally, dividing the first click heatmap into the multiple regions includes a following step.

The first click heatmap is evenly divided into rectangular regions, and a quantity of the rectangular regions is row×col. row is a quantity of rows of the rectangular regions in the first click heatmap. col is a quantity of columns of the rectangular regions in the first click heatmap.

Optionally, for each click source, determining an abnormal click region corresponding to said click source according to the click probability includes following steps.

Such steps are performed for each click source P.

First relative entropy D1, of the click source P relative to other click sources $\overline{P}$, is determined to be:

$$D1=\Sigma_{i=1,j=1}^{row,col} d_{i,j} p_{i,j} \log(p_{i,j}/\overline{p}_{i,j}).$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $\overline{p}_{i,j}$ is the click probability of the other click sources $\overline{P}$ the rectangular region at the i-th row and the j-th column. $d_{i,j}$ is equal to 0 or 1.

All of $d_{i,j}$s when $\Sigma d_{i,j}$ is maximum is determined, under a condition that D1 is less than a first preset threshold.

At least one rectangular region that corresponds to $d_{i,j}$ equal to 0 in the $d_{i,j}$s when $\Sigma d_{i,j}$ is maximum is determined as the abnormal click region.

Optionally, for each click source, determining an abnormal click region corresponding to said click source according to the click probability includes following steps.

$d_{i,j}$s corresponding to each click source when H is minimum are determined. H is a sum of second relative entropy of each click source relative to other click sources, and $$H=\Sigma_{P\in U}\{\Sigma_{i=1,j=1}^{row,col}[d_{i,j}p_{i,j}\log(p_{i,j}/\overline{p}_{i,j})+(1-d_{i,j})\overline{p}_{i,j}\log(\overline{p}_{i,j}/\delta b)]\}.$$

i is a row number of the rectangular regions. j is a column number of the rectangular regions. $d_{i,j}$ is a region-anomaly identifier. $p_{i,j}$ is the click probability of said click source P in a rectangular region at an i-th row and a j-th column. $\overline{p}_{i,j}$ is the click probability of the other click sources $\overline{P}$ the rectangular region at the i-th row and the j-th column. $d_{i,j}$ is equal to 0 or 1. $\delta$ is a penalty coefficient, b is a benchmark click probability, and b=1/(row×col).

For each click source, at least one rectangular region that corresponds to $d_{i,j}$ equal to 0 in the $d_{i,j}$s corresponding to said click source is determined as the abnormal click region.

Optionally, for each click source, determining an abnormal click region corresponding to said click source according to the click probability includes following steps.

For each of the rectangular regions, a maximum is determined among ratios of the click probability of every two click sources corresponding to said rectangular region.

At least one rectangular region that corresponds to the maximum greater than a second preset threshold is determined as the abnormal click region. The second preset threshold is greater than one.

Those skilled in the art should appreciate that embodiments of the present disclosure can be provided as a method, a system, or a computer program product. Thereby, an entire hardware embodiment, an entire software embodiment, or an embodiment of a combination of software and hardware may be employed for the present disclosure. In addition, a computer program product implemented on one or more computer usable storage media (including but not limited to disk storage, CD-ROM, optical storage, etc.) containing computer readable program code may be employed as a form of an embodiment of the present disclosure.

The present disclosure is described with reference to a flowchart and/or a block diagram of a method, an apparatus (a system), and a computer program product according to embodiments of the present disclosure. It is understood that each process and/or block in the flowchart and/or the block diagram, and a combination of the process and/or the block in the flowchart and/or the block diagram can be implemented by computer program instructions. These computer program instructions can be provided to a processor for a general-purpose computer, a special-purpose computer, an embedded processor, or another programmable data processing device, so as to produce a machine. Thus, an apparatus for implementing the a function specified in one or more processes of a flowchart and/or one or more blocks of a block diagram are implemented via instructions executed by a processor of a computer or another programmable data processing device.

The computer program instructions may also be stored in a computer readable memory that can direct a computer or another programmable data processing device to operate in a particular manner, such that the instructions stored in the computer readable memory produce a product, including an instructing apparatus. The instructing apparatus implements the functions specified in one or more processes of a flowchart and/or one or more blocks of a block diagram.

The computer program instructions may also be loaded onto a computer or another programmable data processing device, such that a series of operational steps are performed on the computer or another programmable device to produce computer-implemented processing. Thereby, the instructions executed on the computer or another programmable device provides steps for implementing a function specified in one or more processes of a flowchart and/or one or more blocks of a block diagram.

In a typical configuration, a computing device includes one or more processors (CPUs), an input/output interface, a network interface, and a memory.

The memory may include forms of a computer readable medium, such as a non-persistent memory, a random access memory (RAM), and/or a non-volatile memory. For example, the memory is a read only memory (ROM) or a flash memory. The memory is an example of a computer readable medium.

The computer readable medium includes persistent medium, non-persistent medium, removable medium and non-removable medium. Information storage may be implemented by any method or technology. The information may be computer readable instructions, data structures, modules of programs, or other data. Examples of the computer storage medium include, but are not limited to: a phase change memory (PRAM), a static random access memory (SRAM), a dynamic random access memory (DRAM), or other types of random access memory (RAM); a read only memory. (ROM), an electrically erasable programmable read only memory (EEPROM), flash memory, or a memory with another RAM technology; a compact disk read only memory (CD-ROM), a digital versatile disk (DVD), or another optical storage; a magnetic tape cartridge, a magnetic tape storage, or another magnetic storage devices; or any other non-transmission medium capable to store information that can be accessed by a computing device. As defined herein, the computer readable medium does not include a transitory computer-readable medium (transitory media), such as modulated data signals and carrier waves.

It should be noted that the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

Those skilled in the art should appreciate that embodiments of the present disclosure can be provided as a method, a system, or a computer program product. Thereby, an entire hardware embodiment, an entire software embodiment, or an embodiment of a combination of software and hardware may be employed for the present disclosure. In addition, a computer program product implemented on one or more computer usable storage media (including but not limited to disk storage, CD-ROM, optical storage, etc.) containing computer readable program code may be employed as a form of an embodiment of the present disclosure.

Hereinabove illustrated are merely embodiments of the present disclosure, and the present disclosure is not limited thereto. Various changes and modifications can be made to the present disclosure by those skilled in the art. Any modifications, equivalents, improvements, and the like made within the spirit and scope of the present disclosure is intended to be included within the scope of the claims.

The invention claimed is:

1. A method for detecting abnormality in a click heatmap, comprising:

capturing a click action within a web page to generate a first click heatmap;

dividing the first click heatmap into a plurality of regions, comprising:

dividing the first click heatmap evenly into rectangular regions, wherein a quantity of the rectangular regions is row×col, row is a quantity of rows of the rectangular regions in the first click heatmap, and col is a quantity of columns of the rectangular regions in the first click heatmap;

determining, for each of the plurality of regions, a click probability of a click action corresponding to each click source occurring in said region;

determining, for each click source, an abnormal click region corresponding to said click source according to the click probability, wherein the abnormal click region is at least one of the plurality of regions; and determining abnormal traffic according to the abnormal click region;

wherein determining, for each click source, an abnormal click region corresponding to said click source according to the click probability comprises:

for each click source P, determining first relative entropy D1, of said click source P relative to other click sources $\overline{P}$, to be:

$$D1 = \Sigma_{i=1, j=1}^{row, col} d_{i,j} p_{i,j} \log(p_{i,j}/\overline{p}_{i,j});$$

determining, under a condition that D1 is less than a first preset threshold, all of $d_{i,j}$s when $\Sigma d_{i,j}$ is maximum; and determining one of the rectangular regions as the abnormal click region, wherein the one of the rectangular regions corresponds to $d_{i,j}$ equal to 0 in the $d_{i,j}$s when $\Sigma d_{i,j}$ is maximum;

wherein i is a row number of the rectangular regions, j is a column number of the rectangular regions, $d_{i,j}$ is a region-anomaly identifier, $p_{i,j}$ is the click probability of said click source P in a rectangular region at an i-th one of the rows and a j-th one of the columns, $\bar{p}_{i,j}$ is the click probability of the other click sources $\bar{P}$ the rectangular region at the i-th one of the rows and the j-th one of the columns, and $d_{i,j}$ is equal to 0 or 1.

2. A method for detecting abnormality in a click heatmap, comprising:

capturing a click action within a web page to generate a first click heatmap;

dividing the first click heatmap into a plurality of regions, comprising:

dividing the first click heatmap evenly into rectangular regions, wherein a quantity of the rectangular regions is row×col, row is a quantity of rows of the rectangular regions in the first click heatmap, and col is a quantity of columns of the rectangular regions in the first click heatmap;

determining, for each of the plurality of regions, a click probability of a click action corresponding to each click source occurring in said region;

determining, for each click source, an abnormal click region corresponding to said click source according to the click probability, wherein the abnormal click region is at least one of the plurality of regions; and determining abnormal traffic according to the abnormal click region;

wherein determining, for each click source, an abnormal click region corresponding to said click source according to the click probability comprises:

determining $d_{i,j}$s corresponding to each click source when H is minimum, wherein H is a sum of second relative entropy of each click source relative to other click sources, and $$H=\Sigma_{P\in U}\{\Sigma_{i=1,j=1}^{row,col}[d_{i,j}p_{i,j}\log(p_{i,j}/\bar{p}_{i,j})+(1-d_{i,j})\bar{p}_{i,j}\log(\bar{p}_{i,j}/\delta b)]\};$$

determining, for each click source, one of the rectangular regions as the abnormal click region, wherein the one of the rectangular regions corresponds to $d_{i,j}$ equal to 0 in the $d_{i,j}$s corresponding to said click source;

wherein i is a row number of the rectangular regions, j is a column number of the rectangular regions, $d_{i,j}$ is a region-anomaly identifier, $p_{i,j}$ is the click probability of said click source P in a rectangular region at an i-th one of the rows and a j-th one of the columns, $\bar{p}_{i,j}$ is the click probability of the other click sources $\bar{P}$ the rectangular region at the i-th one of the rows and the j-th one of the columns, $d_{i,j}$ is equal to 0 or 1, $\delta$ is a penalty coefficient, b is a benchmark click probability, and b=1/(row×col).

3. A method for detecting abnormality in a click heatmap, comprising:

capturing a click action within a web page to generate a first click heatmap;

dividing the first click heatmap into a plurality of regions, comprising:

dividing the first click heatmap evenly into rectangular regions, wherein a quantity of the rectangular regions is row×col, row is a quantity of rows of the rectangular regions in the first click heatmap, and col is a quantity of columns of the rectangular regions in the first click heatmap;

determining, for each of the plurality of regions, a click probability of a click action corresponding to each click source occurring in said region;

determining, for each click source, an abnormal click region corresponding to said click source according to the click probability, wherein the abnormal click region is at least one of the plurality of regions; and determining abnormal traffic according to the abnormal click region;

wherein determining, for each click source, an abnormal click region corresponding to said click source according to the click probability comprises:

determining, for each of the rectangular regions, a maximum among ratios of the click probability of every two click sources, corresponding to said rectangular region; and determining one of the rectangular regions as the abnormal click region, wherein the one of the rectangular regions corresponds to the maximum greater than a second preset threshold, the second preset threshold is greater than one, and the maximum is a ratio of the click probability, corresponding to the one of the rectangular regions, between said click source and another click source.

4. A storage medium, storing a storage program, wherein the program when executed controls a device comprising the storage medium to perform the method according to claim 1.

5. A processor, configured to execute a program, wherein when the processor executes the program, the method according to claim 1 is performed.

6. A storage medium, storing a storage program, wherein the program when executed controls a device comprising the storage medium to perform the method according to claim 2.

7. A storage medium, storing a storage program, wherein the program when executed controls a device comprising the storage medium to perform the method according to claim 3.

8. A processor, configured to execute a program, wherein when the processor executes the program, the method according to claim 2 is performed.

9. A processor, configured to execute a program, wherein when the processor executes the program, the method according to claim 3 is performed.

10. An apparatus for detecting abnormality in a click heatmap, comprising:

at least one processor; and a memory storing program instructions, the instructions, when being executed by the processor, causing the apparatus to perform the method according to claim 1.

11. An apparatus for detecting abnormality in a click heatmap, comprising:

at least one processor; and a memory storing program instructions, the instructions, when being executed by the processor, causing the apparatus to perform the method according to claim 2.

12. An apparatus for detecting abnormality in a click heatmap, comprising:

at least one processor; and a memory storing program instructions, the instructions, when being executed by the processor, causing the apparatus to perform the method according to claim 3.

* * * * *